United States Patent
Takahashi

(10) Patent No.: US 12,440,939 B2
(45) Date of Patent: Oct. 14, 2025

(54) POLISHING AGENT FOR SYNTHETIC QUARTZ GLASS SUBSTRATE, METHOD FOR MANUFACTURING THE POLISHING AGENT, AND METHOD FOR POLISHING SYNTHETIC QUARTZ GLASS SUBSTRATE

(71) Applicant: SHIN-ETSU CHEMICAL CO., LTD., Tokyo (JP)

(72) Inventor: Mitsuhito Takahashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1038 days.

(21) Appl. No.: 17/045,189

(22) PCT Filed: Feb. 20, 2019

(86) PCT No.: PCT/JP2019/006198
§ 371 (c)(1),
(2) Date: Oct. 5, 2020

(87) PCT Pub. No.: WO2019/207926
PCT Pub. Date: Oct. 31, 2019

(65) Prior Publication Data
US 2021/0162558 A1   Jun. 3, 2021

(30) Foreign Application Priority Data
Apr. 24, 2018   (JP) ................. 2018-083099

(51) Int. Cl.
B24B 7/24 (2006.01)
C09K 3/14 (2006.01)

(52) U.S. Cl.
CPC ........... B24B 7/241 (2013.01); C09K 3/1409 (2013.01)

(58) Field of Classification Search
CPC ............................. B24B 7/241; C09K 3/1409
See application file for complete search history.

(56) References Cited

U.S. PATENT DOCUMENTS

| | | |
|---|---|---|
| 2004/0035153 A1 | 2/2004 | Koike et al. |
| 2008/0311487 A1 | 12/2008 | Ito et al. |
| 2011/0045745 A1 | 2/2011 | De Messemaeker et al. |
| 2013/0305618 A1 | 11/2013 | Maezawa et al. |
| 2015/0072522 A1 * | 3/2015 | Jung ........... C09K 3/1409 438/669 |
| 2015/0232728 A1 | 8/2015 | Takahashi et al. |
| 2016/0200944 A1 | 7/2016 | Zhou et al. |
| 2016/0272860 A1 | 9/2016 | Mizoguchi et al. |
| 2018/0057399 A1 | 3/2018 | Harada et al. |

FOREIGN PATENT DOCUMENTS

| | | | |
|---|---|---|---|
| CN | 101550318 A | 10/2009 | |
| CN | 101970347 A | 2/2011 | |
| CN | 107109136 A | 8/2017 | |
| CN | 107775484 A | 3/2018 | |
| FR | 2999560 A1 * | 6/2014 | ............ B82Y 30/00 |
| JP | H05-151626 A | 6/1993 | |
| JP | 2004-098278 A | 4/2004 | |
| JP | 2007-213020 A | 8/2007 | |
| JP | 5862578 B2 | 2/2016 | |
| JP | 2016-092045 A | 5/2016 | |
| JP | 2016-098351 A | 5/2016 | |
| JP | 2018-035058 A | 3/2018 | |
| WO | 2014/038536 A1 | 3/2014 | |
| WO | 2014/208414 A1 | 12/2014 | |
| WO | 2017/183290 A1 | 10/2017 | |

OTHER PUBLICATIONS

FR-2999560-A1 (Nahas) Jun. 20, 2014 (English language machine translation). [online] [retrieved Aug. 28, 2023]. Retrieved from: Espacenet. (Year: 2014).*
Mar. 26, 2019 International Search Report issued in International Patent Application No. PCT/JP2019/006198.
Apr. 20, 2021 Office Action issued in Japanese Patent Application No. 2018-083099.
May 26, 2021 Office Action issued in Chinese Patent Application No. 201980027717.6.
Oct. 27, 2020 International Preliminary Report on Patentability issued in International Patent Application No. PCT/JP2019/006198.
Sep. 22, 2023 Office Action issued in Korean Patent Application No. 10-2020-7030435.

* cited by examiner

*Primary Examiner* — Pegah Parvini
(74) *Attorney, Agent, or Firm* — Oliff PLC

(57) ABSTRACT

A polishing agent for a synthetic quartz glass substrate contains polishing particles and water. The polishing particles are composite oxide particles of cerium and yttrium. A content by percent of the cerium in the polishing particles is 71 mol % or more and 79 mol % or less. This provides a polishing agent for a synthetic quartz glass substrate, the polishing agent being capable of sufficiently reducing generation of defects on the surface of the synthetic quartz glass substrate due to polishing without decreasing the polishing rate.

13 Claims, 1 Drawing Sheet

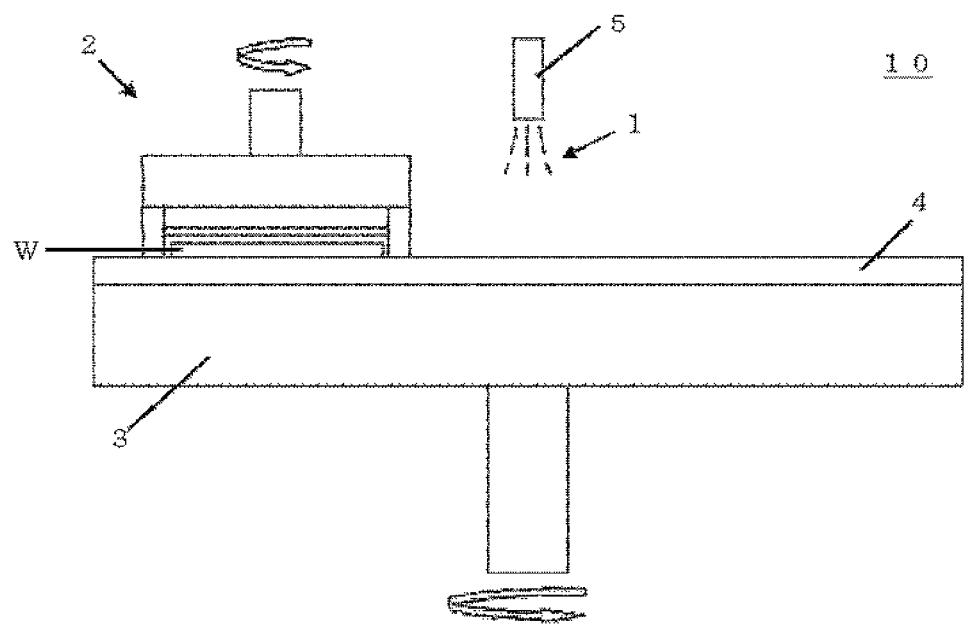

POLISHING AGENT FOR SYNTHETIC QUARTZ GLASS SUBSTRATE, METHOD FOR MANUFACTURING THE POLISHING AGENT, AND METHOD FOR POLISHING SYNTHETIC QUARTZ GLASS SUBSTRATE

TECHNICAL FIELD

The present invention relates to a polishing agent for a synthetic quartz glass substrate, a method for manufacturing the polishing agent, and a method for polishing a synthetic quartz glass substrate by using the polishing agent.

BACKGROUND ART

In recent years, synthetic quartz glass substrates are required to meet more stringent standards for qualities such as defect density, defect size, surface roughness, and flatness, due to pattern miniaturization by photolithography. Above all, higher quality is required against defects on the substrates as integrated circuits become finer and magnetic media have higher capacity.

In view of this, a polishing agent for a synthetic quartz glass substrate is strongly required that the quartz glass substrate after polishing should have small surface roughness, and that the quartz glass substrate should have few surface defects such as a scratch on the polished surface, so as to improve the quality of the quartz glass substrate after polishing.

Conventionally, in general, a silica-based polishing agent has been studied as a polishing agent for polishing a synthetic quartz glass. Silica-based slurry is produced by subjecting silica particles to grain growth through thermal decomposition of silicon tetrachloride and adjusting pH with an alkaline solution, which contains no alkali metal such as sodium. For example, Patent Document 1 describes that defects can be reduced by using high-purity colloidal silica around neutrality. However, considering the isoelectric point of colloidal silica, colloidal silica is unstable around neutrality, and there is concern that the particle size distribution of colloidal silica abrasive grains varies during polishing, thereby bringing about a problem that the colloidal silica cannot be stably used. In addition, it is difficult to circulate and repeatedly use the polishing agent, which thus has to be disposed of after one-time use, resulting in an economically unfavorable problem. Moreover, Patent Document 2 describes that defects can be reduced by using a polishing agent containing an acid and colloidal silica having an average primary particle size of 60 nm or less. However, these polishing agents are insufficient to satisfy current requirements, and further development is required.

Meanwhile, ceria ($CeO_2$) particles are known as a strong oxidizing agent and have chemically active characteristics. It is thus believed that ceria is effective in improving the polishing rate of an inorganic insulator such as glass in comparison with colloidal silica (Patent Document 3, 4).

However, typical ceria-based polishing agents use dry ceria particles. The dry ceria particles have irregular crystal shapes, and the application to a polishing agent results in a problem that defects such as a scratch are easily generated on the surface of the quartz glass substrate in comparison with spherical colloidal silica. Moreover, the dispersion stability of ceria-based polishing agents is lower than that of colloidal silica, causing a problem that the particles are likely to precipitate.

CITATION LIST

Patent Literature

Patent Document 1: Japanese Unexamined Patent Application Publication No. 2004-98278
Patent Document 2: Japanese Unexamined Patent Application Publication No. 2007-213020
Patent Document 3: Japanese Patent No. 5862578
Patent Document 4: International Publication No. WO2014/208414

SUMMARY OF INVENTION

Technical Problem

When wet ceria particles in polyhedral crystal shapes are used instead of dry ceria particles as a ceria-based polishing agent for a synthetic quartz glass substrate, although defects such as a scratch are reduced compared with dry ceria particles, the defects are not reduced sufficiently to meet the requirements. Moreover, wet ceria particles being harder than colloidal silica also readily causes defects.

The present invention has been made in view of the problems as described above. An object of the present invention is to provide: a polishing agent for a synthetic quartz glass substrate, the polishing agent being capable of sufficiently reducing generation of defects on the surface of the synthetic quartz glass substrate due to polishing without decreasing the polishing rate; and a method for manufacturing the polishing agent. Another object of the present invention is to provide a method for polishing a synthetic quartz glass substrate at high polishing rate while sufficiently reducing defects due to polishing.

Solution to Problem

To achieve the object, the present invention provides a polishing agent for a synthetic quartz glass substrate, comprising polishing particles and water, wherein
the polishing particles comprise composite oxide particles of cerium and yttrium, and
a content by percent of the cerium in the polishing particles is 71 mol % or more and 79 mol % or less.

The polishing agent containing such polishing particles is a polishing agent for a synthetic quartz glass substrate, the polishing agent having high polishing rate and being capable of sufficiently reducing generation of defects on the surface of the synthetic quartz glass substrate due to polishing.

More preferably, the polishing particles are particles not subjected to calcination.

With such polishing particles having not undergone calcination, the aforementioned problems of dry ceria particles can be avoided.

Further preferably, the content of the cerium in the polishing particles is 73 mol % or more and 76 mol % or less.

The polishing agent containing such polishing particles is particularly suitably used as a polishing agent for a synthetic quartz glass substrate, the polishing agent having high polishing rate and being capable of sufficiently reducing defects due to polishing.

Further, the present invention provides a method for manufacturing the above-described polishing agent for a synthetic quartz glass substrate, wherein the polishing particles are manufactured by a wet precipitation method using rare earth salts and an excessive alkali compound.

Thus, particles with uniform particle size can be manufactured, and the use of the polishing agent manufactured in this way enables sufficient reduction of defects, which are otherwise generated by polishing.

Here, the rare earth salts are preferably rare earth nitrates, and the alkali compound is preferably urea or a urea compound.

These allow efficient deposition of the polishing particles.

Furthermore, the present invention provides a method for polishing a synthetic quartz glass substrate, comprising a rough polishing step and a final polishing step after the rough polishing step, wherein the inventive polishing agent for a synthetic quartz glass substrate is used in the final polishing step for final polishing.

Such a polishing method using the inventive polishing agent for a synthetic quartz glass substrate achieves high polishing rate and can inhibit defect generation due to polishing. This results in efficient production of synthetic quartz glass substrates with remarkably few defects.

Advantageous Effects of Invention

As has been described above, the present invention makes it possible to sufficiently inhibit defect generation on the surface of a synthetic quartz glass substrate, for example, in the final polishing for the synthetic quartz glass substrate without decreasing the polishing rate. As a result, the productivity and yield can be improved in the production of synthetic quartz glass substrates. Furthermore, by using the inventive polishing agent for a synthetic quartz glass substrate, finer semiconductor devices can be obtained.

BRIEF DESCRIPTION OF DRAWINGS

FIG. 1 is a schematic diagram showing an example of a polishing apparatus usable in a method for polishing a synthetic quartz glass substrate of the present invention.

DESCRIPTION OF EMBODIMENTS

As described above, there have been demands for the development of a polishing agent for a synthetic quartz glass substrate, the polishing agent being capable of sufficiently reducing generation of defects on the surface of the synthetic quartz glass substrate due to polishing without decreasing the polishing rate.

The present inventor has earnestly studied the above problems and consequently found that when a polishing agent for a synthetic quartz glass substrate contains composite oxide particles of cerium and yttrium manufactured as polishing particles such that the polishing particles have a cerium content by percent in a range of 71 mol % or more and 79 mol % or less, synthetic quartz glass substrates can be polished at high polishing rate and with few defects. This finding has led to the present invention.

Specifically, the present invention is a polishing agent for a synthetic quartz glass substrate, comprising polishing particles and water, wherein the polishing particles comprise composite oxide particles of cerium and yttrium, and a content by percent of the cerium in the polishing particles is 71 mol % or more and 79 mol % or less.

Hereinafter, embodiments of the present invention will be described, but the present invention is not limited thereto.

As stated above, the inventive polishing agent for a quartz glass substrate (hereinafter also simply referred to as "polishing agent") contains polishing particles and water. The polishing particles are composite oxide particles of cerium and yttrium, and a content of the cerium contained in the polishing particles is 71 mol % or more and 79 mol % or less. Additionally, the polishing particles are manufactured by a wet precipitation method using rare earth salts such as a cerium salt and an excessive alkali compound.

The inventive polishing agent for a synthetic quartz glass substrate contains the polishing particles as described above, and the use of such polishing particles enables inhibition of defect generation such as damage due to polishing without decreasing the polishing rate.

Hereinbelow, detailed explanation will be given for the components, components that can be optionally added, and polishing a synthetic quartz glass substrate with the inventive polishing agent.

Generally, silica particles are used in final polishing of a synthetic quartz glass substrate. This is because a highly smooth surface with few defects can be obtained owing to the spherical shape and smooth surface of silica particles. However, since silica particles, unlike ceria-based particles, have low reactivity to glass, the polishing rate is low, and silica particles cannot be described as polishing abrasive grains with a high polishing ability.

Although it is possible to improve polishing ability by using ceria-based particles having high reactivity to glass, defects such as scratch are likely to be generated by the polishing in comparison with silica particles. Presumably, this results from the irregular shape of ceria-based particles compared with silica-based particles and from high hardness compared with silica-based particles.

Against these, when particles manufactured by a wet precipitation method using rare earth salts including a cerium salt and an excessive alkali compound are employed as polishing particles, it is possible to reduce the defect generation due to polishing without decreasing the polishing rate.

The inventive polishing particles have an average primary particle size of preferably 100 nm to 500 nm, further preferably 100 nm to 400 nm, particularly preferably 100 nm to 300 nm.

The polishing particles having an average primary particle size of 100 nm or more have sufficiently enough ability to polish quartz glass. Moreover, when the average primary particle size is 500 nm or less, defects such as scratch are not generated by the polishing.

As the composition in the inventive polishing particles, the content by percent (content) of the cerium is 71 mol % or more and 79 mol % or less, further preferably 73 mol % or more and 76 mol % or less. Within this range, polishing particles excellent in polishing performance can be obtained.

If the content by percent of the cerium contained in the polishing particles is less than 71 mol %, the low cerium content by percent causes a problem of low polishing performance. Meanwhile, if the content by percent of the cerium contained in the polishing particles exceeds 79 mol %, the manufactured polishing particles have large particle sizes, bringing about a problem that defects are readily formed by the polishing.

Here, "mol %" refers to a value of cerium with a total of cerium and yttrium being taken as 100%.

The content of each rare earth element in the particles can be measured by elemental analysis. For example, the elemental analysis is possible with an ICP atomic emission spectrometer (ICP-AES).

The polishing particles used in the present invention are preferably particles manufactured by a wet precipitation method such that a solution in which rare earth salts including a cerium salt have been dissolved in water and a basic solution in which an excessive alkali compound has been dissolved in water are mixed and heated.

As a method for manufacturing the polishing particles, first, a cerium solution is prepared by mixing cerium nitrate, which is a precursor as a rare earth salt, with ultrapure water. Similarly, a yttrium solution is prepared by mixing yttrium nitrate, which is a rare earth salt, with ultrapure water, and is mixed with the cerium solution in such a manner that the cerium content is within the range of 71 mol % or more and 79 mol % or less. Thereby, a cerium-yttrium mixed solution is produced.

Next, a basic solution is produced. As the alkali compound of the basic solution, urea or a urea compound can be used. The alkali compound is mixed with ultrapure water to adjust the concentration appropriately for use. Here, as the urea compound, it is possible to use dimethylacetylurea, benzenesulfonylurea, trimethylurea, tetraethylurea, tetramethylurea, triphenylurea, tetraphenylurea, etc.

In the cerium-yttrium mixed solution adjusted to have the cerium content of 71 mol % or more and 79 mol % or less, the ion concentration can be within a range of $0.01$ mol·dm$^{-3}$ to $0.1$ mol·dm$^3$. Moreover, an excessive basic solution (alkali compound) is mixed with the cerium-yttrium mixed solution, and the ion concentration in the basic solution is preferably 20 to 50 times as high as the ion concentration of the cerium-yttrium mixed solution.

By setting the ion concentrations of the mixed solution and the basic solution within the above ranges, the particles with uniform particle size can be manufactured.

Next, after the prepared cerium solution, yttrium solution, and basic solution are transferred to a reaction vessel in a predetermined mixing ratio, the resultant is stirred and heated at a predetermined temperature. Here, the heat treatment may be performed at a heat-treatment temperature of 100° C. or less, for example, 80° C. or more and 100° C. or less. The heating time may be 1 hour or more, for example, 2 hours to 3 hours. In addition, the heating rate from normal temperature to the heat-treatment temperature may be 3° C. to 6° C. per minute; preferably, the temperature may be raised at a rate of 4° C. per minute.

The mixed solution having been subjected to the heat treatment is cooled to room temperature. Through such processes, a mixed solution is produced in which composite oxide particles of cerium and yttrium are generated with an average primary particle size of, for example, 500 nm or less.

As described above, a mixed solution of the cerium solution, the yttrium solution, and the basic solution is heated at a heat-treatment temperature within an appropriate range by raising the temperature at an appropriate heating rate. Thus, the inventive polishing particles are manufactured as composite oxide particles of cerium and yttrium with an average primary particle size of 100 nm to 500 nm.

Note that the inventive polishing particles are preferably particles not subjected to calcination. By not performing a calcination treatment in this manner, the aforementioned problems of dry ceria particles can be avoided.

Then, in the inventive method for manufacturing the polishing agent for a synthetic quartz glass substrate, the polishing particles produced by the wet precipitation method using predetermined rare earth salts (rare earth nitrates) and excessive alkali compound (urea or a urea compound) as described above are mixed with water (particularly pure water), and optionally the following additive may be added or dispersion treatment or the like may be performed to manufacture the inventive polishing agent for a synthetic quartz glass substrate.

The inventive polishing agent may contain an additive to adjust the polishing characteristics. Such an additive includes amino acids and anionic surfactants that can change the surface potential of the polishing particles to negative. When the surface potential of the composite oxide particles is made negative, the particles easily disperse in the polishing agent and do not easily form secondary particles having large particle diameters, so that generation of polishing damage can be further inhibited.

Examples of the anionic surfactants serving as the additive include monoalkyl sulfate, alkylpolyoxyethylene sulfate, alkylbenzene sulfonate, monoalkyl phosphate, lauryl sulfate, polycarboxylic acid, polyacrylate, polymethacrylate, etc. Examples of the amino acids include arginine, lysine, aspartic acid, glutamic acid, asparagine, glutamine, histidine, proline, tyrosine, serine, tryptophan, threonine, glycine, alanine, methionine, cysteine, phenylalanine, leucine, valine, isoleucine, etc.

Regarding the concentration when these additives are used, the content is preferably in a range of 0.001 parts by mass to 0.05 parts by mass based on 1 part by mass of the polishing particles. The content is more preferably in a range of 0.005 parts by mass to 0.02 parts by mass. When the content is 0.001 parts by mass or more relative to 1 part by mass of the polishing particles, the mixed particles in the polishing agent more stably disperse and do not easily form aggregated particles having large particle diameters. Moreover, when the content is 0.05 parts by mass or less relative to 1 part by mass of the polishing particles, the additive does not impede polishing, and can prevent a reduction in the polishing rate. Thus, incorporating the additive in the above range can further improve the dispersion stability of the polishing agent while preventing the reduction in the polishing rate.

The inventive polishing agent preferably has a pH within a range of 3.0 or more and 8.0 or less in view of excellent storage stability and polishing rate of the polishing agent. When the pH is 3.0 or more, the polishing particles stably disperse in the polishing agent. When the pH is 8.0 or less, the polishing rate can be more improved. Moreover, the lower limit of preferable pH range is more preferably 4.0 or more, particularly preferably 6.0 or more. Meanwhile, the upper limit of preferable pH range is 8.0 or less, more preferably 7.0 or less. Further, the pH of the polishing agent can be adjusted by adding: an inorganic acid such as hydrochloric acid, nitric acid, sulfuric acid, or phosphoric acid; an organic acid such as formic acid, acetic acid, citric acid, or oxalic acid; ammonia, sodium hydroxide, potassium hydroxide, tetramethylammonium hydroxide (TMAH), etc.

Next, a method for polishing a synthetic quartz glass substrate by using the inventive polishing agent will be described. The inventive polishing agent is particularly preferably used in a final polishing step after a rough polishing step. Accordingly, the description will be given of an example where single-side polishing is performed in a final polishing step. However, it is a matter of course that the present invention is not limited thereto, and the inventive polishing agent can also be used for rough polishing. Moreover, the inventive polishing agent can be used not only for single-side polishing, but also for double-side polishing or the like.

A single-side polishing apparatus usable in the inventive polishing method can be, for example, a single-side polishing apparatus 10 that includes a turn table 3 to which a polishing pad 4 is attached, a polishing agent supply mechanism 5, a polishing head 2, and so forth as shown in FIG. 1. Moreover, as shown in FIG. 1, the polishing head 2 can rotate and hold a synthetic quartz glass substrate W to be polished. Further, the turn table 3 can also rotate. For the polishing pad 4, nonwoven fabric, foamed polyurethane, porous resins, or the like can be used. Further, since the surface of the polishing pad 4 is preferably always covered with a polishing agent 1 during polishing, the polishing agent supply mechanism 5 is preferably provided with a pump or the like to supply the polishing agent 1 successively. In the single-side polishing apparatus 10 as described above, the polishing head 2 holds the synthetic quartz glass substrate W, and the polishing agent supply mechanism 5 supplies the inventive polishing agent 1 onto the polishing pad 4. Then, the turn table 3 and the polishing head 2 are each rotated to bring the surface of the synthetic quartz glass substrate W into sliding contact with the polishing pad 4 for polishing. Such a polishing method using the inventive polishing agent can accelerate the polishing rate and inhibit generation of defects due to polishing. Moreover, the inventive polishing method can provide a synthetic quartz glass substrate having significantly fewer defects and thus is suitably utilizable for final polishing.

Particularly, a synthetic quartz glass substrate subjected to the final polishing by the inventive polishing method can be used for semiconductor-related electronic materials (particularly, semiconductor-related electronic materials for cutting-edge application), and can be suitably used for photomask, nanoimprinting, and magnetic devices. Note that a synthetic quartz glass substrate before finish polishing can be prepared, for example, by the following procedure. First, a synthetic quartz glass ingot is formed, and then the synthetic quartz glass ingot is annealed. Next, the synthetic quartz glass ingot is sliced into wafers. Subsequently, the sliced wafers are chamfered and then lapped. Thereafter, the surface of each wafer is polished to a mirror finish. After that, the synthetic quartz glass substrate thus prepared can be subjected to final polishing by the inventive polishing method.

EXAMPLE

Hereinafter, the present invention will be specifically described with reference to Examples and Comparative Examples. However, the present invention is not limited thereto.

Example 1

400 g of a cerium-yttrium mixed solution was prepared by diluting 2.84 g of 1 mol/l cerium nitrate solution and 1.16 g of 1 mol/l yttrium nitrate solution with pure water in order that the cerium ion concentration was 71 mol % and the yttrium ion concentration was 29 mol %.

Subsequently, a urea solution was prepared by diluting 48 g of 5 mol/l urea solution with 600 g of pure water, and then mixed with the cerium-yttrium mixed solution to prepare 1000 g of a reaction solution.

The prepared reaction solution was poured into a separable flask. The reaction solution was heated and stirred at 90° C. for 2 hours, and particles were deposited in the reaction solution.

The deposited particles were collected with a centrifugal separator and dried. Thereby, polishing particles were obtained. According to the ICP-AES elemental analysis, the obtained polishing particles had a composition ratio of: cerium 71 mol % and yttrium 29 mol %.

Moreover, the average primary particle size calculated using a transmission electron microscope was 280 nm.

Subsequently, 50 g of the polishing particles were mixed with 950 g of pure water, and subjected to ultrasonic dispersion treatment under stirring. Thus, 1000 g of a 5% polishing agent was produced.

Next, using this polishing agent, a synthetic quartz glass substrate (4 inches: 100 mm) W was polished as shown in FIG. 1 by the inventive method for polishing a synthetic quartz glass substrate.

Specifically, a polishing pad (made of soft suede manufactured by FILWEL Co., Ltd.) 4 was attached to a turn table 3. To a polishing head 2 to which a synthetic quartz glass substrate W can be attached, a roughly polished synthetic quartz glass substrate W was set. Then, the synthetic quartz glass substrate W was polished by 1 μm or more, which is enough to remove the defects generated in the rough polishing step. Here, the polishing load was set to 100 gf/cm$^2$, the rotational speeds of the turn table 3 and the polishing head 2 were set to 50 rpm, and the above polishing agent for a synthetic quartz glass substrate was supplied at 100 ml per minute. The polished synthetic quartz glass substrate W was taken from the polishing head 2, washed with pure water, further subjected to ultrasonic cleaning, and then dried at 80° C. with a drier. The change in thickness of the synthetic quartz glass substrate W before and after the polishing was measured with a reflection spectroscopic film-thickness monitoring system (SF-3 manufactured by OTSUKA Electronics Co., Ltd.) to calculate the polishing rate. In addition, the number of defects of 100 nm or larger generated on the polished surface of the synthetic quartz glass substrate W was counted with a laser microscope. As a result, the polishing rate was 1.0 μm/hr, and the number of defects was 1.

Example 2

400 g of a cerium-yttrium mixed solution was prepared by diluting 3.12 g of 1 mol/l cerium nitrate solution and 0.88 g of 1 mol/l yttrium nitrate solution with pure water in order that the cerium ion concentration was 78 mol % and the yttrium ion concentration was 22 mol %.

After that, a polishing agent was produced and a synthetic quartz glass substrate W was polished by the same procedure as in Example 1. According to the ICP-AES elemental analysis, the obtained polishing particles had a composition ratio of: cerium 79 mol % and yttrium 21 mol %.

Moreover, the average primary particle size calculated using a transmission electron microscope was 350 nm. The polishing rate was 1.2 μm/hr, and the number of defects was 1.

Example 3

400 g of a cerium-yttrium mixed solution was prepared by diluting 2.92 g of 1 mol/l cerium nitrate solution and 1.08 g of 1 mol/l yttrium nitrate solution with pure water in order that the cerium ion concentration was 73 mol % and the yttrium ion concentration was 27 mol %.

After that, a polishing agent was produced and a synthetic quartz glass substrate W was polished by the same procedure as in Example 1. According to the ICP-AES elemental analysis, the obtained polishing particles had a composition ratio of: cerium 74 mol % and yttrium 26 mol %.

Moreover, the average primary particle size calculated using a transmission electron microscope was 300 nm. The polishing rate was 1.1 μm/hr, and the number of defects was 0.

Example 4

400 g of a cerium-yttrium mixed solution was prepared by diluting 3.00 g of 1 mol/l cerium nitrate solution and 1.00 g of 1 mol/l yttrium nitrate solution with pure water in order that the cerium ion concentration was 75 mol % and the yttrium ion concentration was 25 mol %.

After that, a polishing agent was produced and a synthetic quartz glass substrate W was polished by the same procedure as in Example 1. According to the ICP-AES elemental analysis, the obtained polishing particles had a composition ratio of: cerium 76 mol % and yttrium 24 mol %.

Moreover, the average primary particle size calculated using a transmission electron microscope was 310 nm. The polishing rate was 1.1 μm/hr, and the number of defects was 0.

Comparative Example 1

400 g of a cerium solution was prepared by diluting 8.00 g of 1 mol/l cerium nitrate solution with pure water in order that the cerium ion concentration was 100 mol %. After that, a polishing agent was produced and a synthetic quartz glass substrate W was polished by the same procedure as in Example 1.

The average primary particle size calculated using a transmission electron microscope was 6500 nm. The polishing rate was 2.5 μm/hr, and the number of defects was 50.

Comparative Example 2

400 g of a cerium-yttrium mixed solution was prepared by diluting 3.40 g of 1 mol/l cerium nitrate solution and 0.60 g of 1 mol/l yttrium nitrate solution with pure water in order that the cerium ion concentration was 85 mol % and the yttrium ion concentration was 15 mol %.

After that, a polishing agent was produced and a synthetic quartz glass substrate W was polished by the same procedure as in Example 1. According to the ICP-AES elemental analysis, the obtained polishing particles had a composition ratio of: cerium 85 mol % and yttrium 15 mol %.

Moreover, the average primary particle size calculated using a transmission electron microscope was 5000 nm. The polishing rate was 2.4 μm/hr, and the number of defects was 48.

Comparative Example 3

400 g of a cerium-yttrium mixed solution was prepared by diluting 3.20 g of 1 mol/l cerium nitrate solution and 0.80 g of 1 mol/l yttrium nitrate solution with pure water in order that the cerium ion concentration was 80 mol % and the yttrium ion concentration was 20 mol %.

After that, a polishing agent was produced and a synthetic quartz glass substrate W was polished by the same procedure as in Example 1. According to the ICP-AES elemental analysis, the obtained polishing particles had a composition ratio of: cerium 80 mol % and yttrium 20 mol %.

Moreover, the average primary particle size calculated using a transmission electron microscope was 4800 nm. The polishing rate was 2.4 μm/hr, and the number of defects was 45.

Comparative Example 4

400 g of a yttrium solution was prepared by diluting 8.00 g of 1 mol/l yttrium nitrate solution with pure water in order that the yttrium ion concentration was 100 mol %. After that, a polishing agent was produced and a synthetic quartz glass substrate W was polished by the same procedure as in Example 1.

The average primary particle size calculated using a transmission electron microscope was 110 nm. The polishing rate was 0.01 μm/hr, and the number of defects was 2.

Comparative Example 5

400 g of a cerium-yttrium mixed solution was prepared by diluting 2.00 g of 1 mol/l cerium nitrate solution and 2.00 g of 1 mol/l yttrium nitrate solution with pure water in order that the cerium ion concentration was 50 mol % and the yttrium ion concentration was 50 mol %.

After that, a polishing agent was produced and a synthetic quartz glass substrate W was polished by the same procedure as in Example 1. According to the ICP-AES elemental analysis, the obtained polishing particles had a composition ratio of: cerium 49 mol % and yttrium 51 mol %.

Moreover, the average primary particle size calculated using a transmission electron microscope was 140 nm. The polishing rate was 0.06 μm/hr, and the number of defects was 2.

Comparative Example 6

400 g of a cerium-yttrium mixed solution was prepared by diluting 2.80 g of 1 mol/l cerium nitrate solution and 1.20 g of 1 mol/l yttrium nitrate solution with pure water in order that the cerium ion concentration was 70 mol % and the yttrium ion concentration was 30 mol %.

After that, a polishing agent was produced and a synthetic quartz glass substrate W was polished by the same procedure as in Example 1. According to the ICP-AES elemental analysis, the obtained polishing particles had a composition ratio of: cerium 70 mol % and yttrium 30 mol %.

Moreover, the average primary particle size calculated using a transmission electron microscope was 180 nm. The polishing rate was 0.21 μm/hr, and the number of defects was 2.

Table 1 shows the results of Examples 1 to 4 and Comparative Examples 1 to 6 described above. Note that the numbers in the table indicate average values of five synthetic quartz glass substrates W polished in each Example and Comparative Example.

TABLE 1

| | Cerium content (mol %) | Yttrium content (mol %) | Particle size (μm) | Polishing rate (μm/hr) | Defect (number) |
|---|---|---|---|---|---|
| Example 1 | 71 | 29 | 0.28 | 1.00 | 1 |
| Example 2 | 79 | 21 | 0.35 | 1.20 | 1 |
| Example 3 | 74 | 26 | 0.30 | 1.10 | 0 |
| Example 4 | 76 | 24 | 0.31 | 1.10 | 0 |
| Comparative Example 1 | 100 | 0 | 6.50 | 2.50 | 50 |
| Comparative Example 2 | 85 | 15 | 5.00 | 2.40 | 48 |
| Comparative Example 3 | 80 | 20 | 4.80 | 2.40 | 45 |
| Comparative Example 4 | 0 | 100 | 0.11 | 0.01 | 2 |

TABLE 1-continued

| | Cerium content (mol %) | Yttrium content (mol %) | Particle size (μm) | Polishing rate (μm/hr) | Defect (number) |
|---|---|---|---|---|---|
| Comparative Example 5 | 49 | 51 | 0.14 | 0.06 | 2 |
| Comparative Example 6 | 70 | 30 | 0.18 | 0.21 | 2 |

The generation of defects due to polishing was successfully inhibited without decreasing the polishing rate when the synthetic quartz glass substrates W were polished using the polishing agents of Examples 1 to 4, i.e., polishing particles manufactured such that the cerium proportions were within the range of the present invention.

In contrast, with the polishing agents of Comparative Examples 1 to 3 whose cerium proportions exceeded the predetermined proportion, the particle sizes were larger, and the numbers of defects after the polishing were increased. Meanwhile, when the polishing particles of Comparative Examples 4 to 6 were used which had cerium proportions below the predetermined proportion, the particle sizes were smaller, and the polishing rates were decreased.

As described above, it has been shown that when used to polish a synthetic quartz glass substrate, the inventive polishing agent for a synthetic quartz glass substrate enables the polishing while sufficiently inhibiting the generation of defects on the polished surface of the synthetic quartz glass substrate without decreasing the rate of polishing the synthetic quartz glass substrate.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A polishing agent for a synthetic quartz glass substrate, comprising polishing particles and water, wherein
the polishing particles comprise composite oxide particles of cerium and yttrium,
a content by percent of the cerium in the polishing particles is 71 mol % or more and 79 mol % or less,
a content by percent of the yttrium in the polishing particles is 21 mol % or more and 29 mol % or less,
the polishing particles have an average primary particle size of 100 nm to 500 nm,
the polishing particles are wet ceria particles and
the polishing agent has a pH within a range of 3.0 or more and 8.0 or less.

2. The polishing agent for a synthetic quartz glass substrate according to claim 1, wherein the content of the cerium in the polishing particles is 73 mol % or more and 76 mol % or less.

3. The polishing agent for a synthetic quartz glass substrate according to claim 1, wherein the polishing agent includes an additive including at least one of an anionic surfactant or an amino acid.

4. The polishing agent for a synthetic quartz glass substrate according to claim 3, wherein the anionic surfactant is present and is selected from monoalkyl sulfate, alkylpolyoxyethylene sulfate, alkylbenzene sulfonate, monoalkyl phosphate, lauryl sulfate and polymethacrylate.

5. The polishing agent for a synthetic quartz glass substrate according to claim 3, wherein the amino acid is present and is selected from arginine, lysine, aspartic acid, glutamic acid, asparagine, glutamine, histidine, proline, tyrosine, serine, tryptophan, threonine, glycine, alanine, methionine, cysteine, phenylalanine, leucine, valine and isoleucine.

6. The polishing agent for a synthetic quartz glass substrate according to claim 4, wherein the amino acid is present and is selected from arginine, lysine, aspartic acid, glutamic acid, asparagine, glutamine, histidine, proline, tyrosine, serine, tryptophan, threonine, glycine, alanine, methionine, cysteine, phenylalanine, leucine, valine and isoleucine.

7. The polishing agent for a synthetic quartz glass substrate according to claim 3, wherein concentration of the additive is in a range of 0.001 parts by mass to 0.05 parts by mass based on 1 part by mass of the polishing particles.

8. A method for manufacturing the polishing agent for a synthetic quartz glass substrate according to claim 1, wherein the polishing particles are manufactured by a wet precipitation method using rare earth salts and an excessive alkali compound.

9. A method for manufacturing the polishing agent for a synthetic quartz glass substrate according to claim 2, wherein the polishing particles are manufactured by a wet precipitation method using rare earth salts and an excessive alkali compound.

10. The method for manufacturing the polishing agent for a synthetic quartz glass substrate according to claim 8, wherein the rare earth salts are rare earth nitrates, and the alkali compound is urea or a urea compound.

11. The method for manufacturing the polishing agent for a synthetic quartz glass substrate according to claim 9, wherein the rare earth salts are rare earth nitrates, and the alkali compound is urea or a urea compound.

12. A method for polishing a synthetic quartz glass substrate, comprising a rough polishing step and a final polishing step after the rough polishing step, wherein the polishing agent for a synthetic quartz glass substrate according to claim 1 is used in the final polishing step for final polishing.

13. A method for polishing a synthetic quartz glass substrate, comprising a rough polishing step and a final polishing step after the rough polishing step, wherein the polishing agent for a synthetic quartz glass substrate according to claim 2 is used in the final polishing step for final polishing.

* * * * *